US012480494B2

(12) United States Patent
Vartiainen

(10) Patent No.: US 12,480,494 B2
(45) Date of Patent: Nov. 25, 2025

(54) MULTISTAGE CENTRIFUGAL PUMP FOR PUMPING FLUID, AN IMPELLER/ SHAFT ASSEMBLY AND A METHOD FOR ASSEMBLING AN IMPELLER/ SHAFT ASSEMBLY

(71) Applicant: Sulzer Management AG, Wintherthur (CH)

(72) Inventor: Jouni Vartiainen, Kotka (FI)

(73) Assignee: Sulzer Management AG, Wintherthur (CH)

( * ) Notice: Subject to any disclaimer, the term of this patent is extended or adjusted under 35 U.S.C. 154(b) by 130 days.

(21) Appl. No.: 18/272,668

(22) PCT Filed: Jan. 24, 2022

(86) PCT No.: PCT/EP2022/051463
§ 371 (c)(1),
(2) Date: Jul. 17, 2023

(87) PCT Pub. No.: WO2022/161905
PCT Pub. Date: Aug. 4, 2022

(65) Prior Publication Data
US 2025/0075702 A1 Mar. 6, 2025

(30) Foreign Application Priority Data
Jan. 28, 2021 (EP) .................................... 21154000

(51) Int. Cl.
*F04D 29/20* (2006.01)
*F04D 1/06* (2006.01)
*F04D 29/62* (2006.01)

(52) U.S. Cl.
CPC ............... *F04D 1/06* (2013.01); *F04D 29/20* (2013.01); *F04D 29/628* (2013.01); *F05D 2250/294* (2013.01); *F05D 2260/36* (2013.01)

(58) Field of Classification Search
CPC .......... F04D 1/06; F04D 29/20; F04D 29/628; F05D 2250/294; F05D 2260/36
See application file for complete search history.

(56) References Cited

U.S. PATENT DOCUMENTS 1,448,925 A 3/1923 Fulton et al.
5,722,812 A * 3/1998 Knox ................. F04D 29/0413 415/199.1
(Continued)

FOREIGN PATENT DOCUMENTS

CN 203189272 U 9/2013
CN 205331041 U 6/2016
(Continued)

OTHER PUBLICATIONS

International Search Report and Written Opinion issued Apr. 13, 2022 in corresponding International Application No. PCT/EP2022/051463.

*Primary Examiner* — Andrew J Marien
(74) *Attorney, Agent, or Firm* — Global IP Counselors, LLP

(57) ABSTRACT

A multistage centrifugal pump for pumping fluid includes a pump housing having a fluid inlet and a fluid outlet and a flow channel between the inlet and the outlet in the housing. The pump housing includes a number of pumping stages. A shaft is mounted by bearings for rotation about a center axis, and a number of impellers each including a hub having an axial opening are to be fitted on the shaft. When in operation, power is transmitted though the rotating shaft to the impellers, causing torque, radial forces and axial forces. Over the length of the shaft where the impellers are configured to be assembled, the shaft has a diameter that is smaller than the inner diameter of the hub and an adaptor ring is arranged in
(Continued)

the axial opening of the hub to transmit the radial forces between the impeller and the shaft.

10 Claims, 4 Drawing Sheets

(56) References Cited

U.S. PATENT DOCUMENTS

| | | | | |
|---|---|---|---|---|
| 9,816,519 | B2 * | 11/2017 | Nowitzki | F04D 13/10 |
| 2012/0121433 | A1 * | 5/2012 | Slotman | F04D 29/20<br>29/888.025 |
| 2012/0251362 | A1 * | 10/2012 | Forsberg | F04D 13/10<br>417/423.12 |
| 2015/0143822 | A1 * | 5/2015 | Chalmers | F04D 13/06<br>417/424.2 |
| 2015/0159666 | A1 * | 6/2015 | McManus | F04D 29/0467<br>415/199.2 |

FOREIGN PATENT DOCUMENTS

| | | | |
|---|---|---|---|
| CN | 206681995 | U | 11/2017 |
| CN | 207049061 | U | 2/2018 |
| CN | 111828372 | A | 10/2020 |

* cited by examiner

MULTISTAGE CENTRIFUGAL PUMP FOR PUMPING FLUID, AN IMPELLER/ SHAFT ASSEMBLY AND A METHOD FOR ASSEMBLING AN IMPELLER/ SHAFT ASSEMBLY

CROSS-REFERENCE TO RELATED APPLICATION

This application is a U.S. National Stage application of PCT/EP2022/051463, filed Jan. 24, 2022, which claims priority to European Patent Application No. 21154000.0, filed Jan. 28, 2021, the contents of each of which are incorporated herein by reference.

BACKGROUND

Technical Field

The present disclosure relates to multistage centrifugal pump, impeller/shaft assembly for a multistage centrifugal pump, and a method for assembling an impeller/shaft assembly for a multistage centrifugal pump.

More specifically, the present disclosure relates to a multistage centrifugal pump for pumping fluid, the pump comprising:

- a pump housing having a fluid inlet and a fluid outlet and a flow channel between the inlet and the outlet in the housing, the pump housing comprising a number of pumping stages,
- a shaft mounted by bearings for rotation about its center axis,
- a number of impellers, the number of impellers is corresponding to the number of pumping stages, the impellers are rotatable by the shaft and arranged to be rotated about the axis in the flow channel, and each impeller comprises a hub having an axial opening configured to be fitted on the shaft and defining the length of the impeller in the axial direction,
- when in use, power is transmitted though the rotating shaft to the impellers, causing torque, radial forces and axial forces.

Also more specifically, the present disclosure relates to an impeller/shaft assembly for a multistage centrifugal pump comprising

- a shaft for rotation about its center axis,
- a number of impellers, the impellers fastened to the shaft, arranged to be rotated about the axis and each impeller comprises a hub to be fitted on the shaft and defining the length of the impeller in the axial direction.

Background Information

A multistage centrifugal pump has been disclosed for example in reference GB1364117 where the pump comprises: (a) a divided pump housing having an elongated pump chamber defined therein; (b) a pump impeller assembly having a plurality of impellers serially mounted on a rotatable shaft, the pump impeller assembly being mounted within the pump chamber. Divider retainer rings are mounted about the shaft and within all the impellers to retain such impellers in longitudinal position on the shaft. Keys are mounted in accommodating slots formed in and between the shaft and the impellers to retain such impellers in arcuate position on the shaft.

U.S. Pat. No. 1,448,925 discloses a multistage centrifugal pump for pumping fluid, the pump comprising:

- a pump housing having a fluid inlet and a fluid outlet and a flow channel between the inlet and the outlet in the housing, the pump housing is comprising a number of pumping stages.
- a shaft mounted by bearings for rotation about its center axis,
- a number of impellers, the number of impellers is corresponding to the number of pumping stages, the impellers are rotatable by the shaft and arranged to be rotated about the axis in the flow channel, and each impeller comprises a hub having an axial opening configured to be fitted on the shaft and defining the length of the impeller in the axial direction,

- when in use, power is transmitted though the rotating shaft to the impellers, causing torque, radial forces and axial forces, wherein over the length of the shaft where the impellers are configured to be assembled, the shaft has a diameter that is smaller than the inner diameter of the hub and an adaptor ring is arranged into the axial opening of the hub to transmit the radial forces between the impeller and the shaft.

An object of the disclosure is to provide a multistage centrifugal pump that is easy to assembly and where the assembled impeller/shaft combination can be balanced against vibrations in an efficient way. The same object also concerns service/maintenance operations, where the time and cost savings are an object. It is also an object of the disclosure to reduce the manufacturing cost of the multistage pump components. Thus, the object is to provide a multistage centrifugal pump in which the operational and manufacturing relating performance is improved compared to the prior art solutions.

SUMMARY

Objects of the disclosure can be met substantially as disclosed herein, including more details of different embodiments of the disclosure.

According to an embodiment of the disclosure it is provided a multistage centrifugal pump for pumping fluid is provided, the pump comprising:

- a pump housing having a fluid inlet and a fluid outlet and a flow channel between the inlet and the outlet in the housing, the pump housing is comprising a number of pumping stages,
- a shaft mounted by bearings for rotation about its center axis.
- a number of impellers, the number of impellers is corresponding to the number of pumping stages, the impellers are rotatable by the shaft and arranged to be rotated about the axis in the flow channel, and each impeller comprises a hub having an axial opening configured to be fitted on the shaft and defining the length of the impeller in the axial direction,
- when in use, power is transmitted though the rotating shaft to the impellers, causing torque, radial forces and axial forces, wherein over the length of the shaft where the impellers are configured to be assembled, the shaft has a diameter that is smaller than the inner diameter of the hub and an adaptor ring is arranged into the axial opening of the hub to transmit the radial forces between the impeller and the shaft. This provides a multistage centrifugal pump for pumping fluid which pump's performance is considerably improved.

According to an embodiment of the disclosure the hub is connected to the shaft by two adaptor rings. The hub is generally a cylindrical/tubular element, and the two adaptor rings are preferably placed to ends of the hub so that the supporting effect in the radial direction is at the top level. If the adaptor rings would be set at a narrower distance in relation to each other, it might cause kind of wobbling effect to the impeller. The hub is configured to be tighten in radial direction to the shaft by two adaptor rings, each of the adaptor rings extending from an axial end of the hub towards an axial centre of the hub. Alternatively, according to another embodiment, there is one adaptor ring in one end and the other end of the hub is connected to the following hub, bush ring or corresponding with an interlocking shape. By this embodiment the hubs form an array of hubs or bush rings each having only one adaptor ring for connecting to the shaft.

According to an embodiment the hub is provided with a circumferential cavity or cavities for the adaptor ring(s) to fit in. The length of the cavity is preferably slightly longer than the width of the adaptor ring so that the adaptor ring stays within the hub, meaning not protruding out from the cavity. This prevents the axial load to be delivered through the adaptor rings. The axial forces are configured to be transmitted though the hub to the next hub, a bush ring or a shaft collar receiving the axial load. Thus, the axial loads are configured to be delivered through of the hub ends, not through the adaptor rings. So principally it could be said that the adaptor ring is floating on the shaft but since it has tight connection in the radial direction, it does not actually float but has an undefined axial connection to the shaft. This has the effect that the loads in different directions between the shaft and impeller can be separated to different elements. Preferably the shaft has a constant diameter at the length wherein the impellers are configured to be assembled and therefore the shaft can be made as a single diameter smooth surfaced shaft at the location for impellers. This enables the shaft to be manufactured efficiently to an even strength and the assembly of parts, impellers, bush rings and adaptor rings to be simple and quick operation.

According to an embodiment of the disclosure the torque is configured to be transmitted between the impeller and the shaft by a cotter joint. This is a simple and reliable coupling for delivering torque between the shaft and the impeller. Depending on this coupling type, the adaptor ring is a continuous ring, or the adaptor ring has a cut-out to form a C-shaped adaptor ring to provide a passage for a cotter between the hub and the shaft. An adaptor ring having a C-shape can be installed quickly since temperatures of the parts are not especially critical for assembly. A continuous ring having tight tolerances needs to be precisely at a designed temperature for the assembly, otherwise the parts can not fit.

According to an embodiment of the disclosure it is provided a impeller/shaft assembly for a multistage centrifugal pump comprising

- a shaft for rotation about its center axis,
- a number of impellers, the impellers being fastened to the shaft, arranged to be rotated about the axis and each impeller comprises a hub to be fitted on the shaft and defining the length of the impeller in the axial direction,
- over the length of the shaft where the impellers are configured to be assembled, the shaft has a diameter that is smaller than the inner diameter of the hub, the impeller and the shaft are fastened to each other via adaptor rings. This impeller/shaft assembly can be assembled and balanced at workshop and then delivered to the client as a spare part.

According to an embodiment a method for assembling an impeller/shaft assembly for a multistage centrifugal pump, the method comprising following steps:

a) providing a shaft at a predetermined temperature and attaching it to an assembly jig so that the larger diameter end of the shaft is attached to the jig,
b) providing a number of adaptor rings warmed to a temperature higher than the shaft temperature,
c) sliding a first adaptor ring to its position towards a shaft collar,
d) assembling the impeller on the shaft so that the hub is moved axially in respect to the adaptor ring such that the hub encloses radially the adaptor ring and slides to its final position so that the hub cooperates with the first adaptor ring provided on the shaft so as to radially support the hub,
e) sliding a second adaptor ring to its position so that the hub cooperates with the second adaptor so as to radially support the hub
f) repeating the steps c) to e) until all the impellers are assembled on their positions, tightening a fastening element holding the impellers in their axial position.

This method enables a fast and accurate assembly of parts to for the impeller/shaft assembly. Conventionally the shaft has been machined with multiple diameters and grooves for retainer rings and like, and the assembly has been really demanding operation where the parts have been heated to different temperatures and then quickly put together. Now the current method and design enables less complicated assembly with very accurate end results relating to the achieved balancing rate and positioning accuracy.

The exemplary embodiments of the disclosure presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the disclosure are set forth in particular in the appended claims.

BRIEF DESCRIPTION OF THE DRAWINGS

In the following, embodiments of the disclosure are explained in more detail with reference to the drawings.

DETAILED DESCRIPTION

Figure 1:
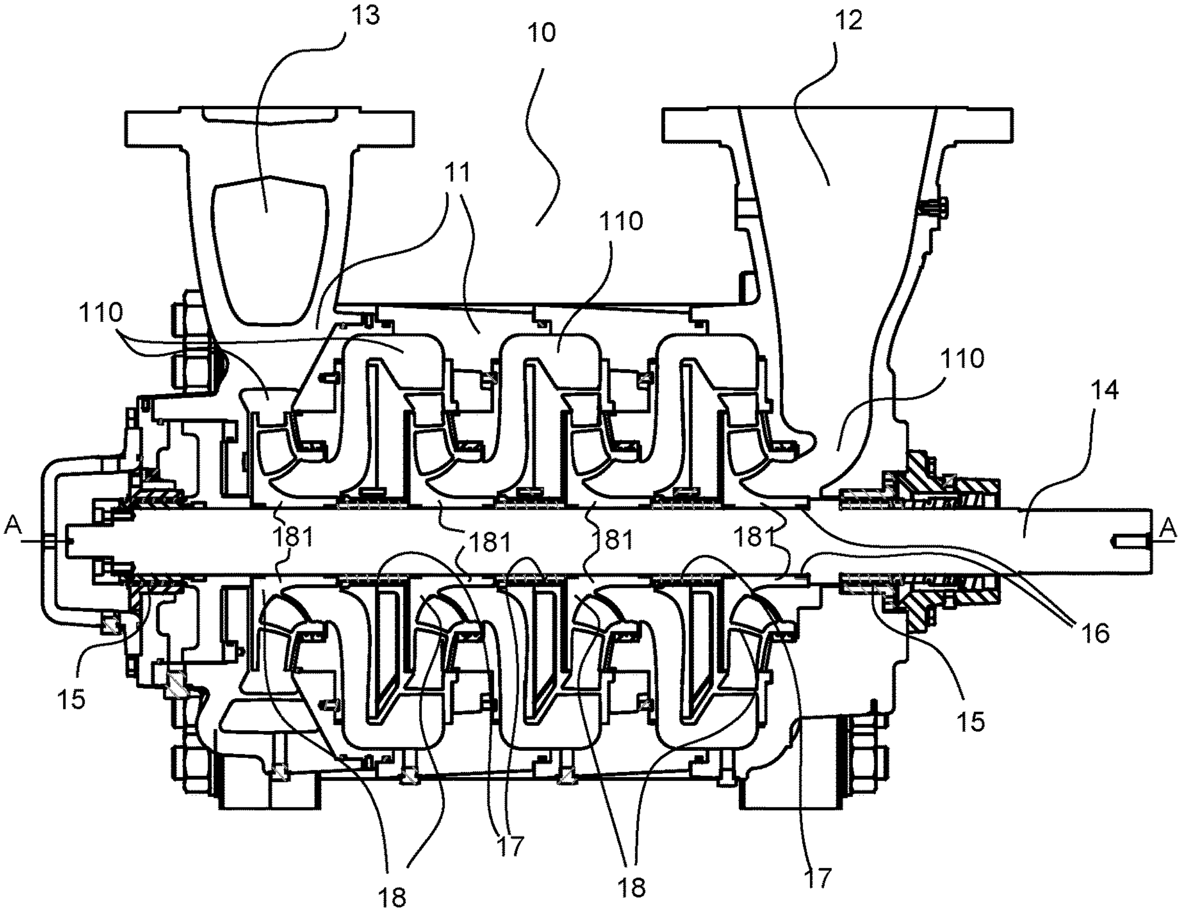
FIG. 1 illustrates a multistage centrifugal pump for pumping fluid according to an embodiment of the disclosure.

FIG. 1 depicts schematically a multistage centrifugal pump 10 for pumping fluid, the pump 10 comprising:

- a pump housing 11 having a fluid inlet 12 and a fluid outlet 13 and a flow channel 110 between the inlet 12 and the outlet 13 in the housing, the pump housing 11 is comprising a number of pumping stages.

- a shaft 14 mounted by bearings 15 for rotation about its center axis A-A,
- a number of impellers 18, the number of impellers 18 is corresponding to the number of pumping stages, the impellers 18 are rotatable by the shaft 14 and arranged to be rotated about the axis A-A in the flow channel 110, and each impeller 18 comprises a hub 181 having an axial opening configured to be fitted on the shaft 14 and defining the length of the impeller 18 in the axial direction,
- when in use, power is transmitted though the rotating shaft 14 to the impellers 18, causing torque, radial forces and axial forces,
- over the length of the shaft 14 where the impellers 18 are configured to be assembled, the shaft 14 has a diameter that is smaller than the inner diameter of the hub 181 and an adaptor ring 16 is arranged into the axial opening of the hub 181 to transmit the radial forces between the impeller 18 and the shaft 14.

Figure 2:
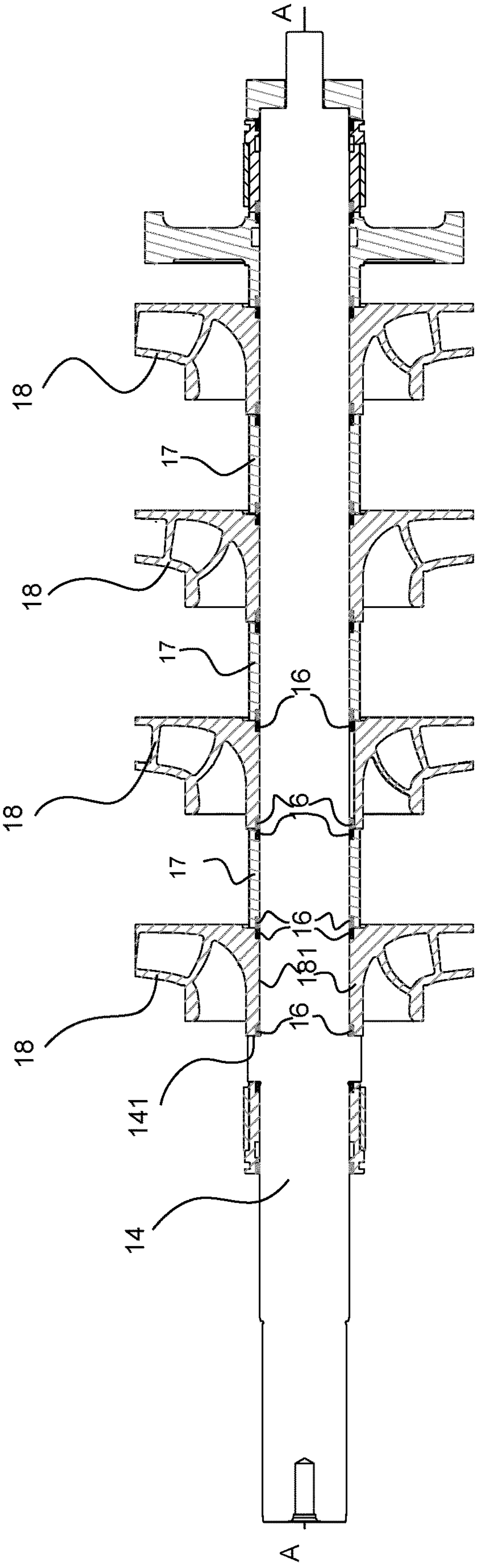
FIG. 2 illustrates an impeller/shaft assembly for a multistage centrifugal pump according to another embodiment of the disclosure.

In FIG. 2 an embodiment of an impeller/shaft assembly for a multistage centrifugal pump is presented, such as presented in FIG. 1. The impeller/shaft assembly comprises

- a shaft 14 for rotation about its center axis A-A,
- a number of impellers 18, the impellers 18 being fastened to the shaft 14, arranged to be rotated about the axis A-A and each impeller 18 comprises a hub 181 to be fitted on the shaft 14 and defining the length of the impeller 18 in the axial direction,
- over the length of the shaft 14 where the impellers 18 are configured to be assembled, the shaft 14 has a diameter that is smaller than the inner diameter of the hub 181, the impeller 18 and the shaft 14 are fastened to each other via adaptor rings 16. The hub 181 is configured to be tighten in radial direction to the shaft 14 by two adaptor rings 16, each of the adaptor rings 16 extending from an axial end of the hub towards an axial centre of the hub, one adaptor ring 16 at each end of the hub 181 in along a hub length in an axial direction. Another embodiment is to have one adaptor ring 16 for each hub 181 but connect the hub 181 to the following hub 181 with an interlocking shape such as a tongue/groove combination or alike. This embodiment is not shown in the figures.

Between the impellers 18 a bush ring or bush rings 17 can be provided. Bush rings can be used for bearing attachment or just as spacers between impellers. In combination, the impellers 18 and bush rings 17 form an axial array of tubular elements set on the shaft 14. In the embodiment of the FIG. 2, the left end of the shaft 14 comprises a shaft collar 141 that forms an axial direction bracket for the array of impellers 18 and bush rings 17 to be tightened towards. This array is tightened from the right end of the shaft 14 with a tightening element, for example with a nut (not presented in the FIG. 2).

According to an embodiment of the disclosure the shaft 14 has a constant diameter at the length wherein the impellers 18 are configured to be assembled. This enables and is especially suitable for above explained multi stage centrifugal pump, an embodiment of method for assembling an impeller/shaft assembly for a multistage centrifugal pump, the method comprising following steps:

- a) providing a shaft 14 at a predetermined temperature and attaching it to an assembly jig so that the larger diameter end of the shaft is attached to the jig,
- b) providing a number of adaptor rings 16 warmed to a temperature higher than the shaft 14 temperature,
- c) sliding a first adaptor ring 16 to its position towards a shaft collar 141.
- d) assembling the impeller 18 on the shaft 14 so that the hub 181 is moved axially in respect to the adaptor ring 16 such that the hub 181 encloses radially the adaptor ring 16 and slides to its final position so that the hub 181 cooperates with the first adaptor ring 16 provided on the shaft 14 so as to radially support the hub 181,
- e) sliding a second adaptor ring 16 to its position so that the hub 181 cooperates with the second adaptor ring 16 so as to radially support the hub 181,
- f) repeating the steps c) to e) until all the impellers are assembled on their positions.
- tightening a fastening element holding the impellers in their axial position.

The method can further comprise the following step (if the construction requires):

- 0) sliding a bush ring 17 on the shaft 14 for providing a spacing between the impellers 18. In the present method the temperature differences required for assembly are significantly less than with conventional constructions. As the impellers are quite often large and heavy parts, handling of such parts is complicated if the assembly temperature needs to be elevated to high temperatures to utilize the thermal expansion of the parts. In a case of conventional construction where the radial fit is done by machining the impeller hub tolerance to fit snugly on the shaft, the temperature difference between the shaft and the impeller needs to be considerable. The impeller is normally heated and the shaft can be cooled. If the temperature difference is lost during the assembly for some reason, there is a risk that the impeller gets stuck to an incorrect position on the shaft. Also in the conventional construction there are retainer rings to keep the axial positions correct, bearings and like, it takes some time to assembly and fit the parts together. These constructional elements that slow down the assembly, they also increase the risk of the loss of the temperature difference during the assembly. The removal of such situation can even deteriorate the surfaces of the shaft and surfaces of an axial opening inside the hub. With the present method just the adaptor rings need to be heated, but the impeller does not need to be heated, because the snug fit is achieved by the tolerances of the adaptor ring 16/shaft 14 and adaptor ring 16/hub cavity 182. And if the adaptor ring has a cut-out to form a C-shaped adaptor ring it is used, the need for heating is minimal or not even needed.

Figure 3:
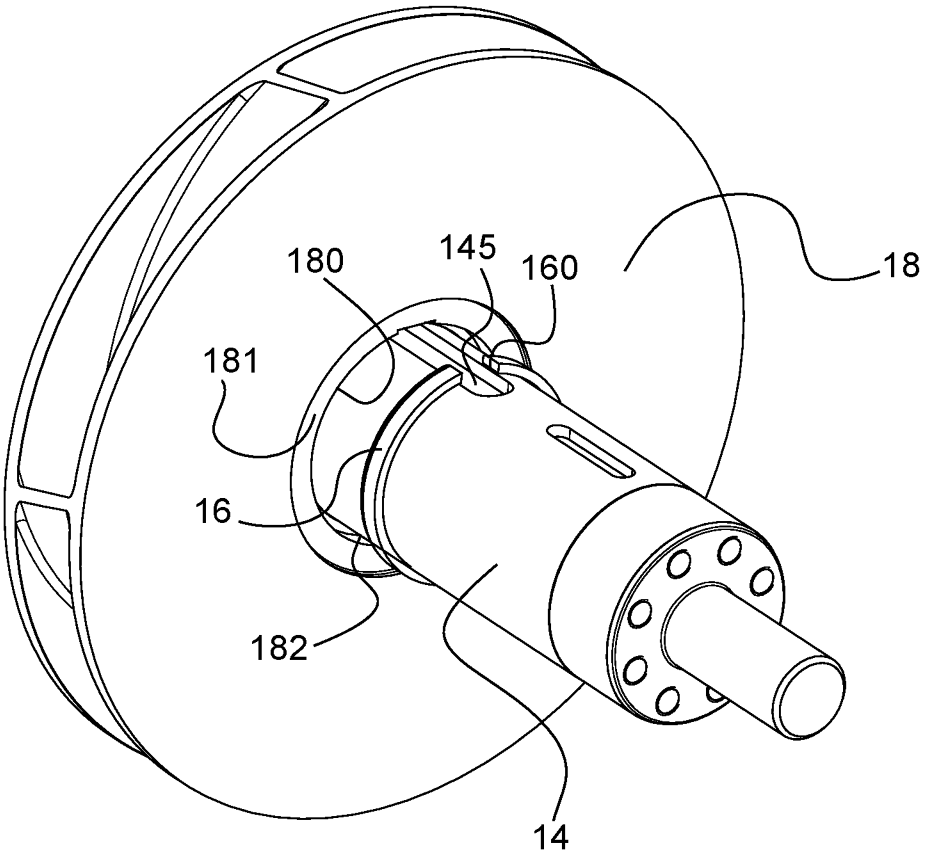
FIG. 3 illustrates an impeller/shaft assembly for a multistage centrifugal pump according to still another embodiment of the disclosure.

In FIG. 3 it is presented an embodiment of an impeller 18/shaft 14 assembly for a multistage centrifugal pump is presented. FIG. 3 illustrates that the shaft 14 has a diameter that is smaller than the inner diameter of the hub 181 and adaptor ring 16 would be arranged into the axial opening 180 of the hub 181 to transmit the radial forces between the impeller 18 and the shaft 14. The hub 181 includes a circumferential cavity 182 or cavities 182 for the adaptor ring(s) 16 to fit in. The cavity 182 comprises radially inner surface which is parallel to the outer surface of the shaft 14 and the adaptor ring 16 has rectangular cross section. The torque (gen-erated by a pump motor not shown in figures) is configured to be transmitted between the impeller 18 and the shaft 14 by a cotter joint 145. The adaptor ring 16 is a continuous ring or the adaptor ring 16 has a cut-out to form a C-shaped adaptor ring 16 to provide a passage for a cotter or key (not shown) between the hub 181 and the shaft 14. It depends for example on the cotter joint design which of the two options is more preferred for the adaptor ring 16 design, continuous ring or with a cut-out.

Figure 4:
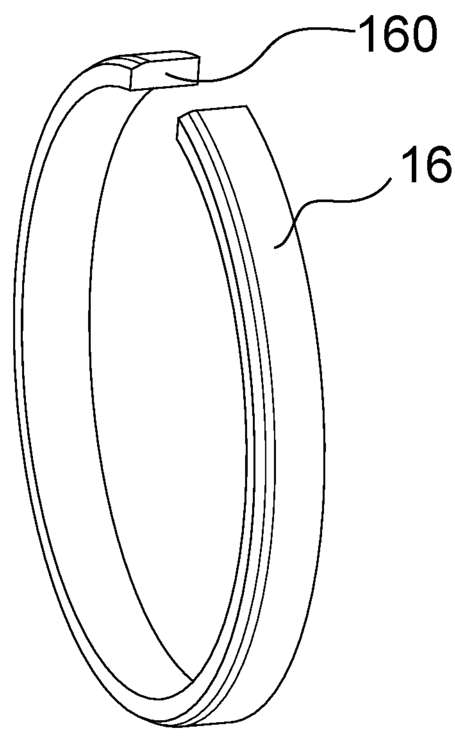
FIG. 4 illustrates an adaptor ring for a multistage centrifugal pump for pumping fluid according to an embodiment of the disclosure.

In FIG. 4 an embodiment of an adaptor ring 16 is presented. The function of the adaptor ring is to bear radial direction or compression forces between the impeller 18 and the shaft 14. The adaptor ring 16 has a cut-out 160 to form a C-shaped adaptor ring 16 to provide a passage for a cotter. The adaptor ring is made such material that is suitable for that kind of load, preferably it is made of composite material, steel or other metallic material. Preferably the adaptor ring 16 has a rectangular cross section so that it does not transfer any axial loads to radial loads or vice versa. The axial length of the adaptor ring is in a range ⅕-1/20 of the axial length of the hub 181, depending on the required strength dimensioning, material parameters, required load bearing capacity, etc.

While the disclosure has been described herein by way of examples in connection with what are, at present, considered to be the most preferred embodiments, it is to be understood that the disclosure is not limited to the disclosed embodiments, but is intended to cover various combinations or modifications of its features, and several other applications included within the scope of the disclosure, as defined in the appended claims. The details mentioned in connection with any embodiment above can be used in connection with another embodiment when such combination is technically feasible.

The invention claimed is:

1. A multistage centrifugal pump for pumping fluid, the pump comprising:

- a pump housing having a fluid inlet, and a fluid outlet and a flow channel between the fluid inlet and the fluid outlet in the housing, the pump housing is comprising a plurality of pumping stages;
- a shaft mounted by bearings to be rotational about a center axis thereof;
- a plurality of impellers, a number of the plurality of impellers corresponding to a number of the plurality of pumping stages, the impellers rotatable by the shaft and arranged to be rotated about the center axis in the flow channel, and each impeller of the plurality of impellers comprises a hub having an axial opening configured to be fitted on the shaft and defining a length of the impeller in an axial direction,
- when in operation, power is transmitted though the shaft to the plurality of impellers, causing torque, radial forces and axial forces, the shaft comprises a shaft collar to receive the axial forces,
- over a length of the shaft where the impellers are configured to be assembled, the shaft has a constant diameter that is smaller than the inner diameter of the hub and two adaptor rings are arranged into the axial opening of the hub to transmit the radial forces between the impeller and the shaft,
- the hub is configured to be tighten in a radial direction to the shaft by the two adaptor rings, each of the two adaptor rings extending from an axial end of the hub towards an axial center of the hub, and
- the hub includes at least one circumferential cavity, the two adaptor ring configured to fit in the at least one circumferential cavity, a length of the at least one circumferential cavity being longer than a width of the two adaptor rings so that the two adaptor rings do not protrude out from the at least one circumferential cavity to prevent an axial load to be delivered through the two adaptor rings.

2. The multistage centrifugal pump according to claim 1, wherein the hub is connected to the shaft by the two adaptor rings.

3. The multistage centrifugal pump according to claim 1, wherein the axial forces are configured to be transmitted though the hub to another hub, a bush ring or a shaft collar receiving the axial load.

4. The multistage centrifugal pump according to claim 1, wherein the torque is configured to be transmitted between the impeller and the shaft by a cotter joint.

5. The multistage centrifugal pump according to claim 1, wherein each of the two adaptor rings is a continuous ring or the two adaptor rings has a cut-out to form a C-shaped adaptor ring to provide a passage for a cotter between the hub and the shaft.

6. The multistage centrifugal pump according to claim 1, wherein the two adaptor rings are formed from a composite material, steel or other metallic material.

7. The multistage centrifugal pump according to claim 1, wherein the cavity comprises radially inner sur-face which is parallel to an outer surface of the shaft and the two adaptor rings have a rectangular cross section.

8. The multistage centrifugal pump according to claim 1, wherein an axial length of each of the two adaptor rings is ⅕-1/20 of an axial length of the hub.

9. An impeller/shaft assembly for a multistage centrifugal pump, comprising:

- a shaft configured to rotate for rotation about a center axis,
- a plurality of impellers, each impeller of the plurality of impellers being fastened to the shaft and, arranged to be rotated about the center axis, each impeller of the plurality of impellers comprising a hub to be fitted on the shaft and defining a length of the impeller in an axial direction,
- over a length of the shaft where the plurality of impellers are configured to be assembled, the shaft has a constant diameter that is smaller than an inner diameter of the hub of each impeller of the plurality of impellers and the shaft are fastened to each other via two adaptor rings,
- the hub of each impeller of the plurality of impellers is configured to be tighten in a radial direction to the shaft by the two adaptor rings, one of the two adaptor rings at each end of the hub along a hub length in the axial direction,
- the hub of each impeller of the plurality of impellers includes at least one circumferential cavity, the two adaptor rings configured to fit in the at least one circumferential cavity, the length of the at least one circumferential cavity being longer than a width of the two adaptor rings so that the two adaptor rings do not protrude out from the at least one circumferential cavity to prevent an axial load to be delivered through the two adaptor rings.

10. A method for assembling an impeller/shaft assembly for a multistage centrifugal pump, the method comprising following steps:

- providing a shaft at a predetermined temperature; the shaft attachable to an assembly jig so that a larger diameter end of the shaft is to be attached to the assembly jig,
- providing a first and second adaptor rings warmed to a temperature higher than the predetermined temperature of the shaft for each of a plurality of impellers;
- sliding the first adaptor ring to a position towards a shaft collar;

assembling the impeller on the shaft so that the hub is moved axially with respect to the first adaptor ring such that the hub radially encloses the first adaptor ring and slides to a final position so that the hub cooperates with the first adaptor ring provided on the shaft so as to radially support the hub, sliding the second adaptor ring to a position so that the hub cooperates with the second adaptor ring so as to radially support the hub;

tightening a fastening element holding each of the plurality of impellers in an axial position.

* * * * *